US011740132B2

(12) United States Patent
Wei et al.

(10) Patent No.: US 11,740,132 B2
(45) Date of Patent: Aug. 29, 2023

(54) METHOD AND APPARATUS FOR COLOR LOOKUP USING A MOBILE DEVICE

(71) Applicant: Datacolor, Inc., Lawrenceville, NJ (US)

(72) Inventors: Hong Wei, Princeton, NJ (US); Sachin Deshpande, Plainsboro, NJ (US); Taeyoung Park, Princeton, NJ (US)

(73) Assignee: Datacolor, Inc., Lawrenceville, NJ (US)

( * ) Notice: Subject to any disclaimer, the term of this patent is extended or adjusted under 35 U.S.C. 154(b) by 526 days.

(21) Appl. No.: 16/591,088

(22) Filed: Oct. 2, 2019

(65) Prior Publication Data

US 2021/0102842 A1   Apr. 8, 2021

(51) Int. Cl.
| | | |
|---|---|---|
| *G01J 3/50* | (2006.01) | |
| *G01J 3/52* | (2006.01) | |
| *G06T 11/00* | (2006.01) | |

(52) U.S. Cl.
CPC ........... *G01J 3/501* (2013.01); *G01J 3/52* (2013.01); *G06T 11/001* (2013.01)

(58) Field of Classification Search
CPC .. G01J 3/501; G01J 3/52; G01J 3/0272; G01J 3/463; G01J 3/524; G01J 3/513; G06T 11/001
See application file for complete search history.

(56) References Cited

U.S. PATENT DOCUMENTS

| | | | |
|---|---|---|---|
| 6,435,654 B1 * | 8/2002 | Wang | .................... H04N 1/6033 347/19 |
| 8,600,153 B2 | 12/2013 | Gershon et al. | |
| 9,047,633 B2 | 6/2015 | Gershon et al. | |
| 9,087,357 B2 | 7/2015 | Gershon et al. | |
| 9,348,844 B2 | 5/2016 | Gershon et al. | |
| 9,395,292 B2 * | 7/2016 | Wei | ....................... G01J 3/0291 |
| 9,436,704 B2 | 9/2016 | Gershon et al. | |

(Continued)

FOREIGN PATENT DOCUMENTS

| | | |
|---|---|---|
| EP | 2116896 B1 | 5/2013 |
| WO | 2019/133505 A1 | 7/2019 |

OTHER PUBLICATIONS

Transmittal of the International Search Report and the Written Opinion of the International Searching Authority, International application No. PCT/US19/54306, dated Jan. 2, 2020, copy consists of 10 pages.

(Continued)

*Primary Examiner* — Aaron W Carter

(57) ABSTRACT

A processing system of a mobile device acquires an image of an object of a target color, wherein the image was captured by an integrated digital camera of the mobile device, calculates a first plurality of values that describes the target color, and wherein the calculating is based on an analysis of a pixel of the image, and identifies a first candidate color from among a plurality of candidate colors, wherein each candidate color in the plurality of candidate colors is associated with a second set of values that describes the each candidate color, and wherein the second set of values describing the first candidate color matches the first set of values more closely than any second set of values associated with another candidate color of the plurality of candidate colors.

24 Claims, 6 Drawing Sheets

(56) References Cited

U.S. PATENT DOCUMENTS

| | | |
|---|---|---|
| 9,607,404 B2 | 3/2017 | Gershon et al. |
| 2006/0023272 A1* | 2/2006 | Tezuka ............... H04N 1/6033 358/1.9 |
| 2008/0013828 A1* | 1/2008 | Pearson ............. H04N 1/6055 382/167 |
| 2008/0094474 A1 | 4/2008 | Pierce |
| 2008/0266563 A1* | 10/2008 | Redman ............... G01J 3/0272 356/406 |
| 2010/0054588 A1* | 3/2010 | Simson ............. H04N 9/04557 382/167 |
| 2011/0022719 A1 | 1/2011 | Anderson et al. |
| 2012/0076402 A1* | 3/2012 | Smith .................. G06V 10/56 382/165 |
| 2012/0224764 A1* | 9/2012 | Weng ................ G09B 19/0023 382/159 |
| 2013/0322750 A1* | 12/2013 | Agarwal .............. G06V 10/56 382/165 |
| 2014/0240587 A1 | 8/2014 | Cote et al. |
| 2015/0006099 A1* | 1/2015 | Pham ................. G01C 21/165 702/93 |
| 2015/0198522 A1* | 7/2015 | Wei ..................... G01J 3/0251 356/421 |
| 2015/0332479 A1 | 11/2015 | Gershon et al. |
| 2015/0363945 A1* | 12/2015 | Atsmon ................... G06T 7/90 382/162 |
| 2016/0187199 A1* | 6/2016 | Brunk ................. H04N 5/2354 348/89 |
| 2017/0200289 A1 | 7/2017 | Gershon et al. |
| 2017/0213361 A1* | 7/2017 | Peden ................. H04N 1/6047 |
| 2017/0358106 A1* | 12/2017 | Yoshimura ............ G06V 10/56 |
| 2018/0061101 A1* | 3/2018 | Pangasa ............. G06F 3/04845 |
| 2018/0124259 A1 | 5/2018 | Kusaka et al. |
| 2018/0129845 A1 | 5/2018 | Negro |
| 2019/0019313 A1* | 1/2019 | Xu .......................... G06T 7/90 |
| 2019/0279400 A1 | 9/2019 | Xu |
| 2021/0102842 A1* | 4/2021 | Wei ...................... G01J 3/524 |
| 2021/0150743 A1* | 5/2021 | Schrama ................ G06T 7/90 |
| 2022/0205781 A1* | 6/2022 | Greiner ................. G01S 19/01 |

OTHER PUBLICATIONS

Extended EP Search Report for Application No. 19947603.7, dated Jun. 2, 2023, 9 pages.

* cited by examiner

METHOD AND APPARATUS FOR COLOR LOOKUP USING A MOBILE DEVICE

FIELD OF THE DISCLOSURE

The present invention generally relates to the measurement of color, and more specifically relates to color lookup using a smart phone.

BACKGROUND

Many industries, including textiles, coatings, and the like, rely on color matching. Color matching may involve identifying a target color (e.g., from an object or from a known standard) and subsequently reproducing the target color in a color mixture, i.e., so that any visual difference between the color mixture and the target color is minimized. For instance, a customer may ask for a can of paint to be mixed in a color that matches the color of a wall in the customer's home, so that touch-ups to the wall can be made in a manner that "blends in." Similarly, an automobile manufacturer may ask that a coating be mixed in a color that matches the color of existing automobiles built by the manufacturer, in order to ensure color consistency across the manufacturer's line.

SUMMARY OF THE DISCLOSURE

In one example, a method performed by a processing system of a mobile device includes acquiring an image of an object of a target color, wherein the image was captured by an integrated digital camera of the mobile device, calculating a first plurality of values that describes the target color, and wherein the calculating is based on an analysis of a pixel of the image, and identifying a first candidate color from among a plurality of candidate colors in a color library, wherein each candidate color in the plurality of candidate colors is associated with a second set of values that describes the each candidate color, and wherein the second set of values describing the first candidate color matches the first set of values more closely than any second set of values associated with another candidate color of the plurality of candidate colors.

In another example, a non-transitory computer-readable medium stores instructions. When executed by a processing system of a mobile device, the instructions cause the processing system to perform operations. The operations include acquiring an image of an object of a target color, wherein the image was captured by an integrated digital camera of the mobile device, calculating a first plurality of values that describes the target color, and wherein the calculating is based on an analysis of a pixel of the image, and identifying a first candidate color from among a plurality of candidate colors in a color library, wherein each candidate color in the plurality of candidate colors is associated with a second set of values that describes each candidate color, and wherein the second set of values describing the first candidate color matches the first set of values more closely than any second set of values associated with another candidate color of the plurality of candidate colors.

In another example, a method performed by a processing system in a communication network, includes acquiring an image of an object of a target color, wherein the image was captured by an integrated digital camera of a mobile device that is communicatively coupled to the processing system, calculating a first plurality of values that describes the target color, and wherein the calculating is based on an analysis of a pixel of the image, identifying a first candidate color from among a plurality of candidate colors in a color library, wherein each candidate color in the plurality of candidate colors is associated with a second set of values that describes the each candidate color, and wherein the second set of values describing the first candidate color matches the first set of values more closely than any second set of values associated with another candidate color of the plurality of candidate colors, and transmitting information about the first candidate color to the mobile device.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1A:
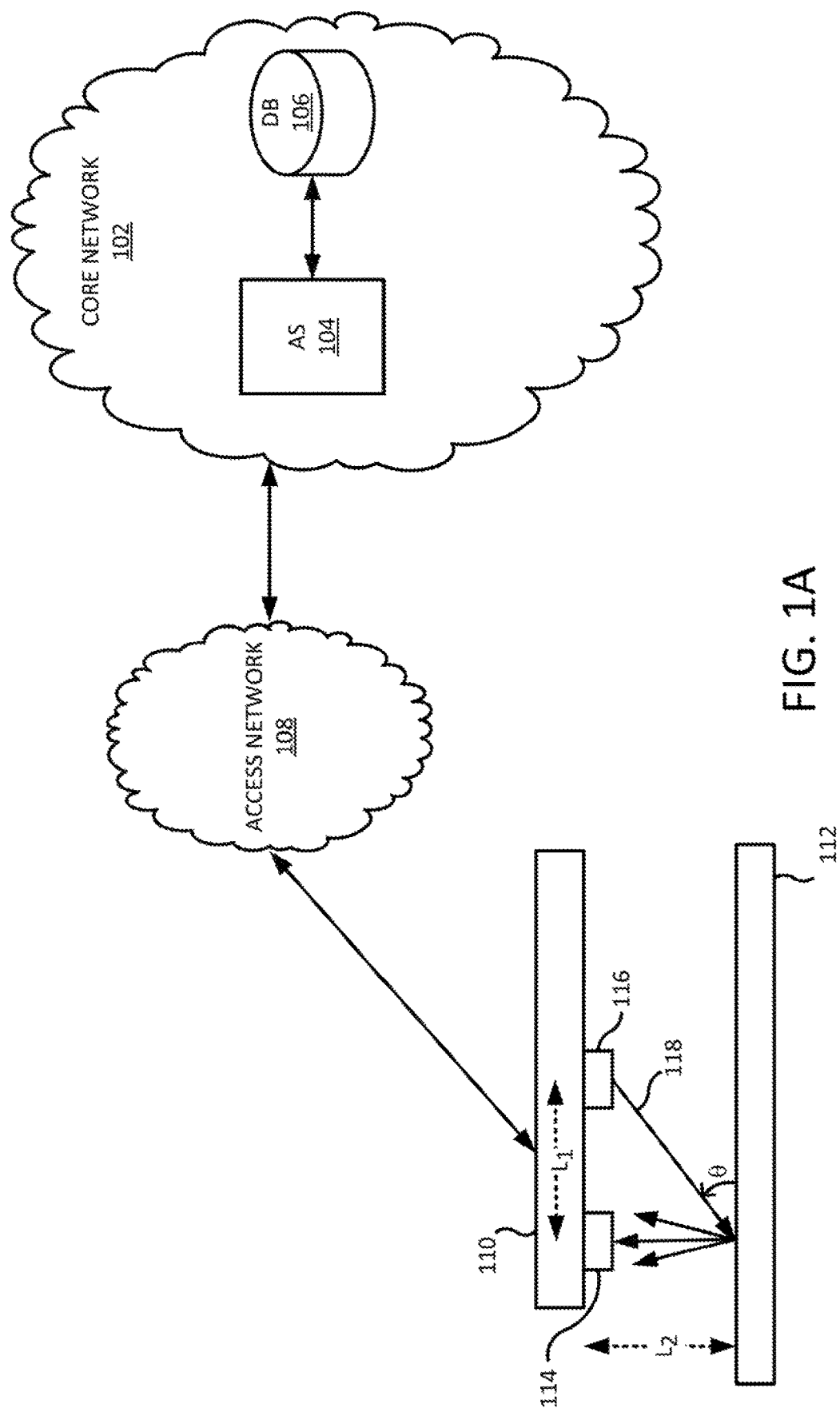
FIG. 1A illustrates an example system in which examples of the present disclosure for color lookup using a mobile device may operate.

In one example, the present invention includes a method, apparatus, and non-transitory computer-readable medium for color lookup using a mobile device. As discussed above, color matching may involve identifying a target color and subsequently reproducing the target color in a color mixture, i.e., so that any visual difference between the color mixture and the target color is minimized. Accurate identification of the target color, also referred to as "color lookup," is therefore vital to the color matching process. Many existing systems for color lookup include colorimeters that can be paired with a mobile device, such as a smart phone or a tablet computer, to assist users in identifying and communicating colors. However, depending on the circumstances, it may not always be convenient for the user to carry or use the colorimeter.

Examples of the present disclosure provide a method by which a mobile device, operating on its own, can provide the same color lookup functionality as a mobile device paired with a colorimeter. In one example, the mobile device's light emitting diode (LED) flashlight/flash may be used as a light source to illuminate the target color, while the mobile device's rear-facing camera may be used as the color sensor. The ambient light may be overflooded by maintaining a maximum intensity of light emission by the flashlight while bringing the mobile device very close to an object of a target color.

The mobile device may then capture an image of the object, and an application (either installed and executing locally on the mobile device or hosted on a remote device such as a server) may process the image to estimate a first set of values that describes the target color in a first color space that approximates the perception of color by the human eye (e.g., the International Commission on Illumination (CIE) 1931 XYZ, or CIEXYZ, color space). The application may further convert the first set of values to a second set of values that describes the target color in a second, different color space (e.g., the CIE L*a*b*, or CIELAB, color space). The second set of values may be used to search an existing color database for a match (e.g., a closest color from a palette of colors). When the distance between the mobile device and the target color is set to a constant, accurate and repeatable color matching can be achieved.

Within the context of the present disclosure, "color tristimulus values" are understood to be values as defined by the CIE XYZ color space, e.g., in which Y represents luminance, Z is quasi-equal to blue, and X represents a mix of response curves chosen to be non-negative. CIEXYZ values are linear in light intensity and thus are amenable to matrix-based estimation from camera values. Furthermore, within the context of the present disclosure, "L*a*b* values" are understood to be values in the CIELAB color space, e.g., in which color is expressed as three values: L* for the lightness from black (0) to white (100); a* from green (−) to red (+); and b* from blue (−) to yellow (+). The CIELAB color space is considered more perceptually uniform than the CIEXYZ color space and is intended to approximate the perception of color by the human eye.

Figure 1B:
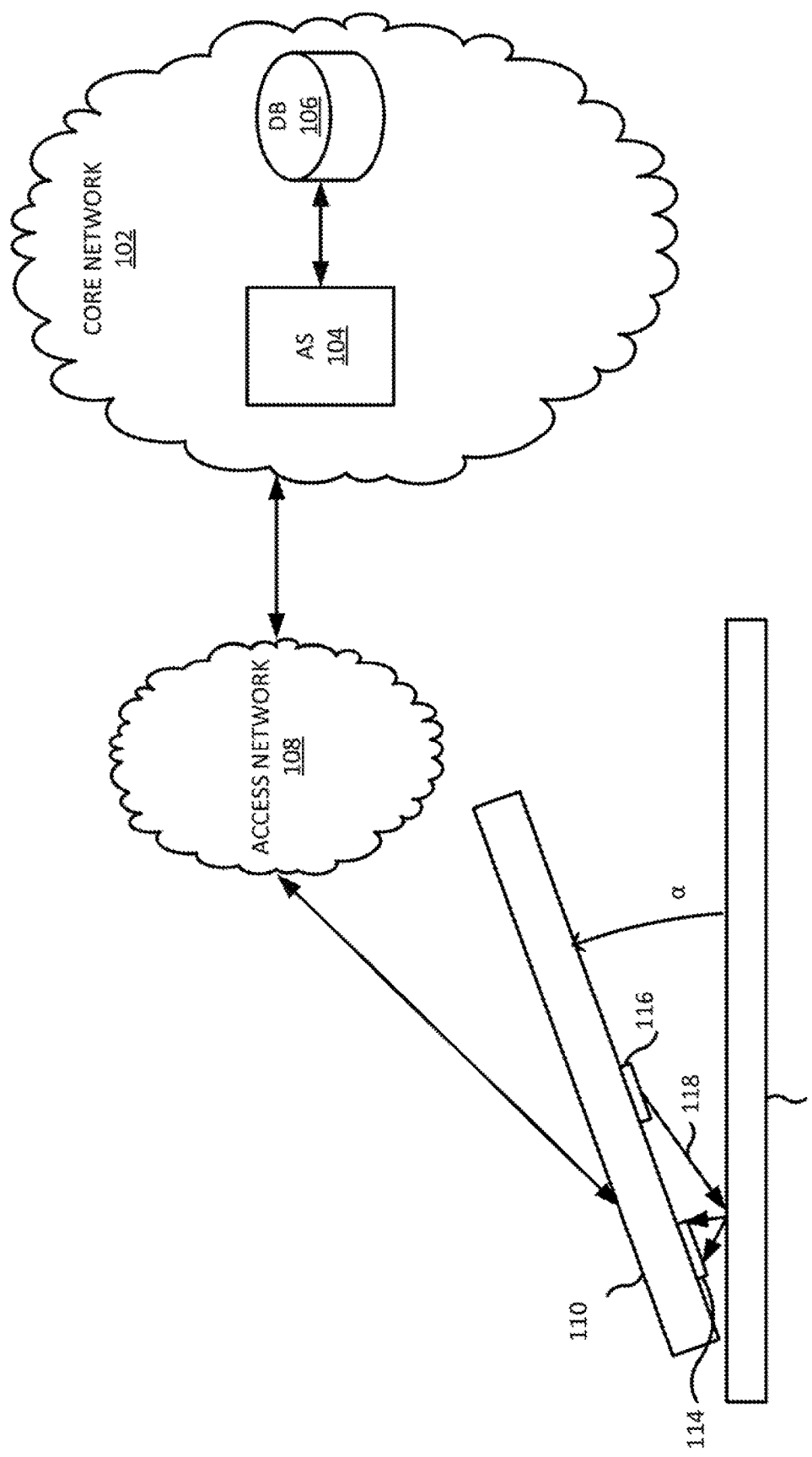
FIG. 1B illustrates another example system in which examples of the present disclosure for color lookup using a mobile device may operate.

To further aid in understanding the present disclosure, FIG. 1A illustrates an example system 100 in which examples of the present disclosure for color lookup using a mobile device may operate. FIG. 1B illustrates another example system in which examples of the present disclosure for color lookup using a mobile device may operate. The components of FIG. 1A and FIG. 1B are the same; however, the orientation of the mobile device relative to the object whose color is being looked up differs as discussed in further detail below.

The system 100 may include one or more types of communication networks, including a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises (also referred to as the/a "cloud").

The core network 102 may be in communication with one or more access networks, such as access network 108. The access network 108 may include a wireless access network (e.g., a WiFi network and the like), a mobile or cellular access network, a PSTN access network, a cable access network, a wired access network, or the like. The core network 102 and the access network 108 may be operated by different service providers, the same service provider, or a combination thereof.

In accordance with the present disclosure, the core network 102 may include an application server (AS) 104 and a database (DB) 106. The AS 104 may comprise a computing system or server, such as the computing system 500 depicted in FIG. 5, and may be configured to provide one or more operations or functions for color lookup, as described herein. For instance, the AS 104 may be configured to obtain images or a target color from a mobile device, to measure the target color, and to identify a candidate color in a color library that most closely matches the candidate color.

Figure 5:
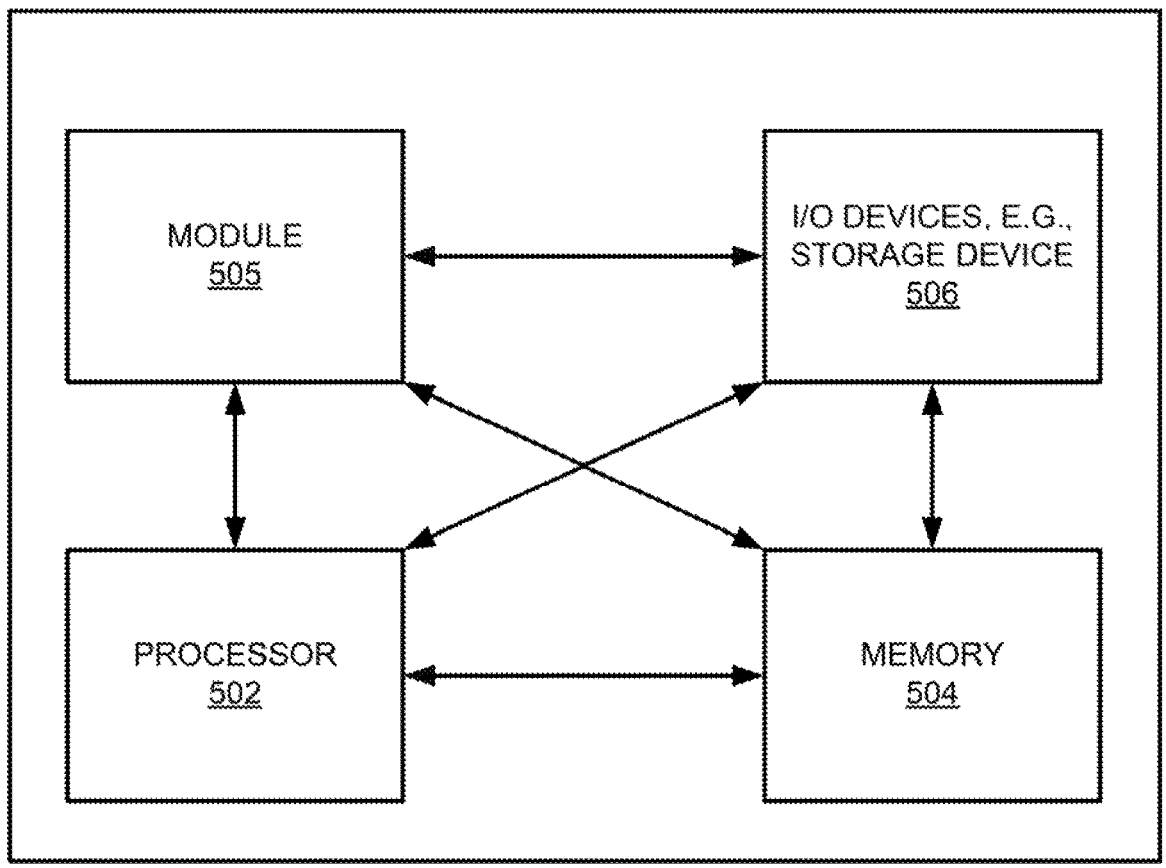
FIG. 5 is a high level block diagram of the calibration method that is implemented using a general purpose computing device.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

The AS 104 may be communicatively coupled to a database (DB) 106. The DB 106 may store data that is used by the AS 104 to perform operations or functions for color lookup, as described herein. For instance, the DB 106 may store data including a color library. The color library may include a palette, or a plurality of different colors, where each color in the plurality of different colors may be considered a candidate for matching to a target color, as discussed in further detail below. In one example, the color library may include, for each color included in the color library: a color name, a numerical color identifier, L*a*b* values describing the color, and or other identifying information (e.g., a source or manufacturer of the color, whether the color belongs to a curated collection of colors, etc.). The color library may be provided by a manufacturer of a software application that is used for color lookup. Alternatively or in addition, at least a portion of the color library may be provided by one or more manufacturers of commercial items. For instance, the color library may include fan decks from paint manufacturers, textile manufacturers, and the like.

Although only a single application server (AS) 104 and a single database (DB) 106 are illustrated in FIGS. 1A and 1B, it should be noted that any number of servers and databases may be deployed. For instance, a plurality of servers and databases may operate in a distributed and/or coordinated manner as a processing system to perform operations for color lookup, in accordance with the present disclosure. For ease of illustration, various additional elements of network 102 are omitted from FIGS. 1A and 1B.

In one example, the access network 108 may be in communication with one or more user endpoint devices, such as a mobile device 110. In one example, the mobile device 110 may be any type of mobile endpoint device, such as a cellular telephone, a smart phone, a tablet computer, a laptop computer, a netbook, an ultrabook, a portable media device (e.g., an MP3 player), a portable gaming device, a digital media player, and the like, or even a wearable device such as a smart watch. The mobile device 110 may be configured as a computer similar to that illustrated in FIG.

5 and described in greater detail below. In one example, the mobile device 110 includes an integrated digital camera 114 and a light source (e.g., a light emitting diode or LED flashlight/flash) 116.

In one example, the integrated digital camera 114 is a red, green, blue (RGB) camera comprising a two-dimensional (2D) array of photosensors and an array of red, green, and blue color filters deposited over the photosensors. The color filters may be arranged in a "Bayer" pattern, i.e., such that each photosensor is covered by one color filter, and such that fifty percent of the color filters are green, twenty-five percent of the color filters are red, and twenty-five percent of the color filters are blue. The larger number of green color filters in the Bayer pattern reflects the fact that the human eye is more sensitive to green light than to red light or blue light.

Figure 2:
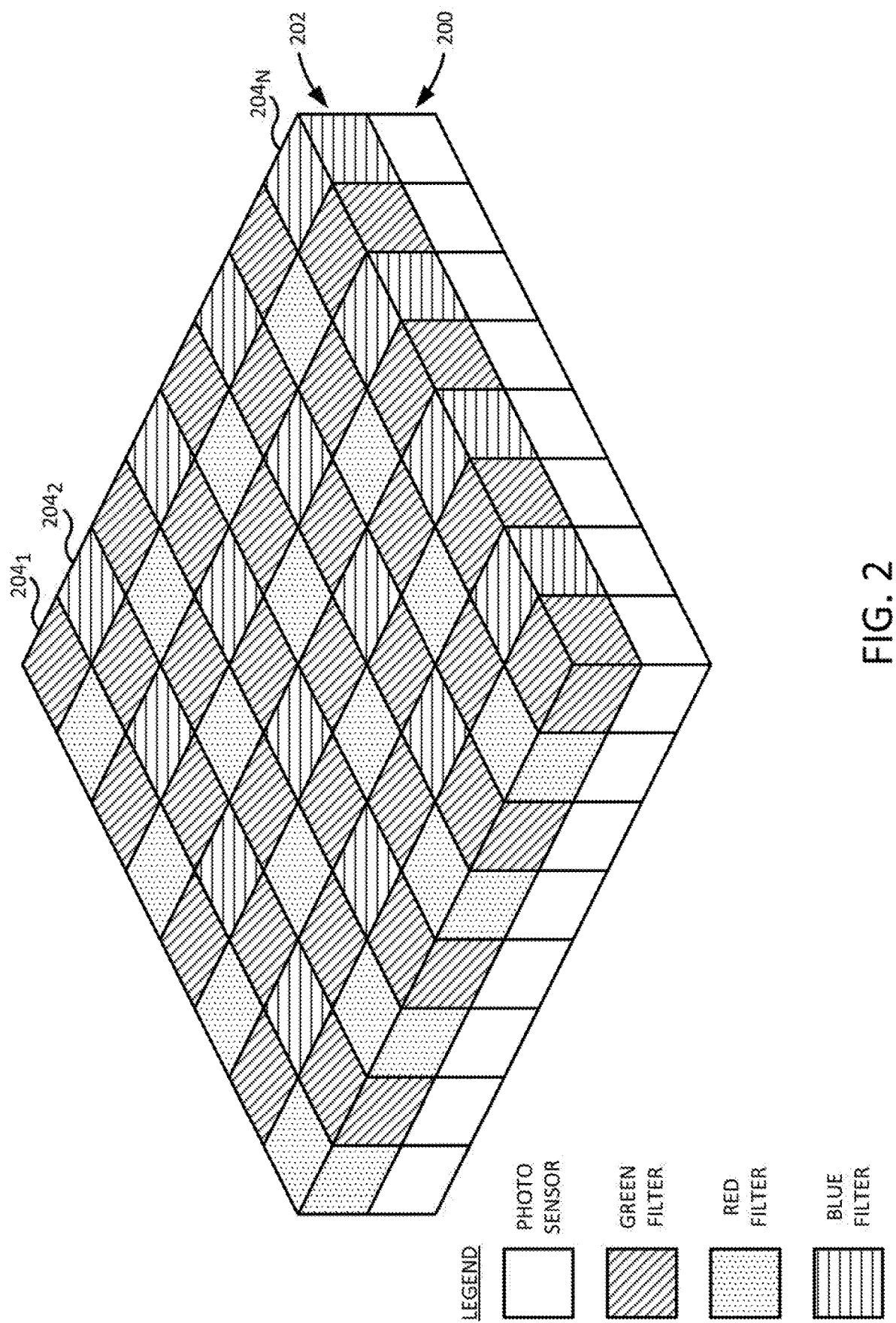
FIG. 2 is a schematic diagram illustrating one example of an array of photosensors and a corresponding array of color filters arranged in a Bayer pattern.

FIG. 2 is a schematic diagram illustrating one example of an array 200 of photosensors and a corresponding array 202 of colorfilters arranged in a Bayer pattern. As illustrated, the array 200 of photosensors comprises a plurality of photosensors arranged in a square (e.g., N×N) array. Above the array 200 of photosensors is the array 202 of color filters. The array 202 of color filters includes red, green, and blue color filters as noted in the legend.

To achieve a Bayer pattern of fifty percent green color filters, twenty-five percent red filters, and twenty-five percent blue filters, a first row 204$_1$ of the array 202 of color filters may comprise a first pattern of alternating red and green filters. A second row 204$_2$ of the array 202 of color filters, which is adjacent to the first row 204$_1$, may comprise a second pattern of alternating green and blue filters. The first pattern and the second pattern may be alternated, row-by-row, in the array 202 of color filters as shown. In one example, no green filter of the array 202 of color filters is positioned directly adjacent to another green filter. However, the green filters may be positioned diagonally relative to each other.

Referring back to FIGS. 1A and 1B, when a broadband visible light 118 (which contains red, green, and blue light) is incident on the integrated digital camera's array 200 of photosensors, the broadband visible light 118 may be filtered by the color filters prior to being collected by the photosensors. That is, the color filters will allow the corresponding colors in the broadband visible light 118 to pass through to the photosensors, but will block other colors of the broadband visible light 118. For instance, the red color filters will allow red light to pass through to the photosensors; the green color filters will allow green light to pass through to the photosensors; and the blue color filters will allow blue light to pass through to the photosensors. A photosensor beneath a given color filter will collect the signal of the light that the given color filter has allowed to pass through. Thus, the responses of the color filters in the integrated digital camera 114 are similar to the responses of the sensors used in a typical colorimeter.

In one example, the integrated digital camera 114 may be color calibrated prior to being used to perform any sort of color lookup. To calibrate the integrated digital camera 114, the integrated digital camera 114 may be used to capture images of a set of m training colors (i.e., colors whose color tristimulus values are already known).

Next, for each image, the raw counts for each color filter may be averaged to create three averaged raw counts: a red channel averaged raw count $d_R$, a green channel averaged raw count $d_G$, and a blue channel averaged raw count $d_B$. Thus, a single color measurement D, made by the integrated digital camera, may be defined as a 3×m matrix D, where:

$$D = \begin{bmatrix} d_R \\ d_G \\ d_B \end{bmatrix}. \quad \text{(EQN. 1)}$$

In addition, a 3×m matrix $R_T$ may be constructed to contain the known color tristimulus values of the m training colors (under a predefined standard illuminant and CIE color match functions).

To calibrate the integrated digital camera, then, the 3×3 matrix M and the offset 1×m vector b may be estimated, where M and b map the matrix D as closely as possible to the matrix $R_T$, such that:

$$R_T = MD + b \quad \text{(EQN. 2).}$$

EQN. 2 may be further expressed as a homogenous equation, such that:

$$R_T = M_A D_A \quad \text{(EQN. 3).}$$

where $M_A$=[M b] is a 3×4 matrix comprising the matrix M right-augmented by the column vector b, and $D_A$=[D' 1'] is a 4×m matrix comprising the matrix D augmented from the bottom by a row m-vector 1 of ones. In this case, D' is the transpose of the matrix D.

To estimate $M_A$, the following least-square approximation may be used:

$$M_A = R_T \text{pinv}(D_A) = R_T D_A'(D_A D_A')^{-1} \quad \text{(EQN. 4)}$$

In one example, the mobile device 110 may be calibrated in the factory, e.g., by the mobile device's manufacturer. In this case, the calibration matrix may be stored either in the local memory of the mobile device 110, or at a remote server.

In another example, the set of m training colors may be printed on a paper card or sheet (e.g., a five inch by seven inch card or sheet, on which each training color may be printed in at least a one inch by one inch square for easy alignment during measurement). A paper card or sheet of this nature may allow the calibration matrix to be easily re-generated by the end user after the mobile device 100 leaves the factory (e.g., to compensate for long-term drift of the integrated digital camera 114 and/or light source 116), or may allow the end user to generate the calibration matrix for the first time in the field (e.g., where the mobile device 100 was not calibrated in the factory). The paper card or sheet may include a quick response (QR) code or other machine-readable code that, when scanned, will cause the color tristimulus values of the training colors to be automatically downloaded (e.g., from a remote server or from the local memory of the mobile device 110).

In yet another example, the mobile device 110 may skip the calibration but use an averaged color calibration matrix that is generated by the manufacturer of the phone or of the software application that performs the color lookup. In this case, a plurality of mobile devices of the same make and model as the mobile device 110 may be used as master instruments. The averaged color calibration matrix for each mobile device mark and model may be stored in the software application (which may be subsequently loaded onto the mobile device, as discussed below) or at a remote server.

The use of the m training colors for calibration, as discussed above, comprises a linear correction. However, in another example, an abbreviated correction of the mobile device 110 may be performed in place of or in addition to a full re-calibration. The abbreviated correction may also be linear, but may be simpler than a full re-calibration, as the abbreviated correction does not require a large set of training colors. The abbreviated correction may utilize a white patch and a black patch in the mobile device 110, along with a pre-loaded color calibration matrix that corresponds to the make and model of the mobile device 110. The abbreviated correction may compensate for variation of the integrated digital camera's sensitivity and/or variation of the light source's flash intensity from mobile device to mobile device (of the same make and model).

A patch of black and patch of white may be printed on a small paper sheet or card, similar to the set of test colors described above. Alternatively, a white sample and a black sample provided from a commercial fandeck or provided by a provider of the software application that performs the color lookup may be used. The raw counts of the black color and the white color from the red, green, and blue channels may be measured using master instruments of the same make and model as the mobile device 110 (e.g., by the manufacturer of the mobile device 110 or by the manufacturer of the software application). $[\tilde{d}_{R,wht}, \tilde{d}_{G,wht}, \tilde{d}_{B,Wht}]$ may express the raw counts of the white color as measured by the master instruments, while $[\tilde{d}_{R,blk}, \tilde{d}_{G,blk}, \tilde{d}_{B,blk}]$ may express the raw counts of the black color as measured by the master instruments. These raw counts may be saved in the local memory of the mobile device 110 or on a remote server.

An end user may subsequently measure the same black and white samples using the mobile device 110. $[\tilde{d}_{R,wht}, \tilde{d}_{G,wht}, \tilde{d}_{B,Wht}]$ may express the raw counts of the white color as measured by the mobile device 110, while $[\tilde{d}_{R,blk}, \tilde{d}_{G,blk}, \tilde{d}_{B,blk}]$ may express the raw counts of the black color as measured by the mobile device 110. A linear mapping that will bring the raw counts of the red channel from the mobile device 110 closer to the raw counts of the red channel from the master instruments may be expressed as:

$$\begin{cases} \tilde{d}_{R,wht} = k_{1,R} \times d_{R,wht} + k_{2,R} \\ \tilde{d}_{R,blk} = k_{1,R} \times d_{R,blk} + k_{2,R} \end{cases} \quad \text{(EQN. 5)}$$

where the linear correction coefficients for the red channel (i.e., $k_{1,R}$ and $k_{2,R}$) can be solved using simple linear algebra as follows:

$$k_{1,R} = \frac{\tilde{d}_{R,wht} - \tilde{d}_{R,blk}}{d_{R,wht} - d_{R,blk}} \quad \text{(EQN. 6)}$$

$$k_{2,R} = \frac{\tilde{d}_{R,blk} \times d_{R,wht} - \tilde{d}_{R,wht} \times d_{R,blk}}{d_{R,wht} - d_{R,blk}}$$

Similar equations may be used to solve the linear correction coefficients for the green and blue channels. The full set of linear correction coefficients (i.e., $k_{1,R}, k_{2,R}, k_{2,G}, k_{1,B},$ and $k_{2,B}$) may be saved in the local memory of the mobile device 110 or on a remote server.

The raw counts generated from an arbitrary measurement may first be corrected according to:

$$\begin{cases} d_{R,corrected} = k_{1,R} \times d_R + k_{2,R} \\ d_{G,corrected} = k_{1,G} \times d_G + k_{2,G} \\ d_{B,corrected} = k_{1,B} \times d_B + k_{2,B} \end{cases} \quad \text{(EQN. 7)}$$

In one example, the corrected raw counts may subsequently be converted into the color tristimulus values in accordance with EQN. 9, which is discussed in further detail in connection with FIG. 3. In another example (e.g., where a linear correction has been performed using a white patch and a black patch as described above), however, the averaged color conversion matrix that is generated using the plurality of master instruments may be used to convert the corrected raw counts into the color tristimulus values.

In some examples, the linear correction (using m training colors) and the abbreviated correction (using black and white samples) may be performed on the same system, i.e., the linear correction and the abbreviated correction are not mutually exclusive, but may work together. For instance, in one example, the linear correction using m training colors may be applied to a master instrument (e.g., mobile device), while the abbreviated correction using the black and white samples may be applied at least once to each individual device of the same make and model as the master instrument.

In one example, the mobile device 110 may be configured to host an application that communicates with the AS 104 and/or DB for performing color lookup. For instance, the application may guide a user of the mobile device 110 through a process whereby the integrated digital camera 114 is used to capture an image of an object 112 of a target color (where the light source 116 is used to illuminate the object 112 during image capture). The application may further guide the user through steps by which the mobile device 110 is used to measure the target color (e.g., identify color tristimulus values or L*a*b* values of the target color) in the image of the object 112. The application may further guide the user through steps whereby the mobile device 110 is used to perform a search in a color library connected to the mobile device 110 (e.g., database 106), where the search identifies a candidate color in the color library that most closely matches the target color.

In other examples, however, the application that is hosted on the mobile device 100 may guide the user through the steps of capturing the image of the object 112. The application may then guide the user through steps whereby the image is transmitted from the mobile device 110 to a remote server (e.g., AS 104), where the remote server measures the target color in the image, performs the search of the color library, and transmits a result of the search back to the mobile device 110. In this case, the memory and the processing resources of the mobile device 110 may be conserved by offloading the most processing intensive steps of the process to the remote server.

It should also be noted that the system 100 has been simplified. Thus, it should be noted that the system 100 may be implemented in a different form than that which is illustrated in FIGS. 1A and 1B without departing from the scope of the present disclosure.

Figure 3:
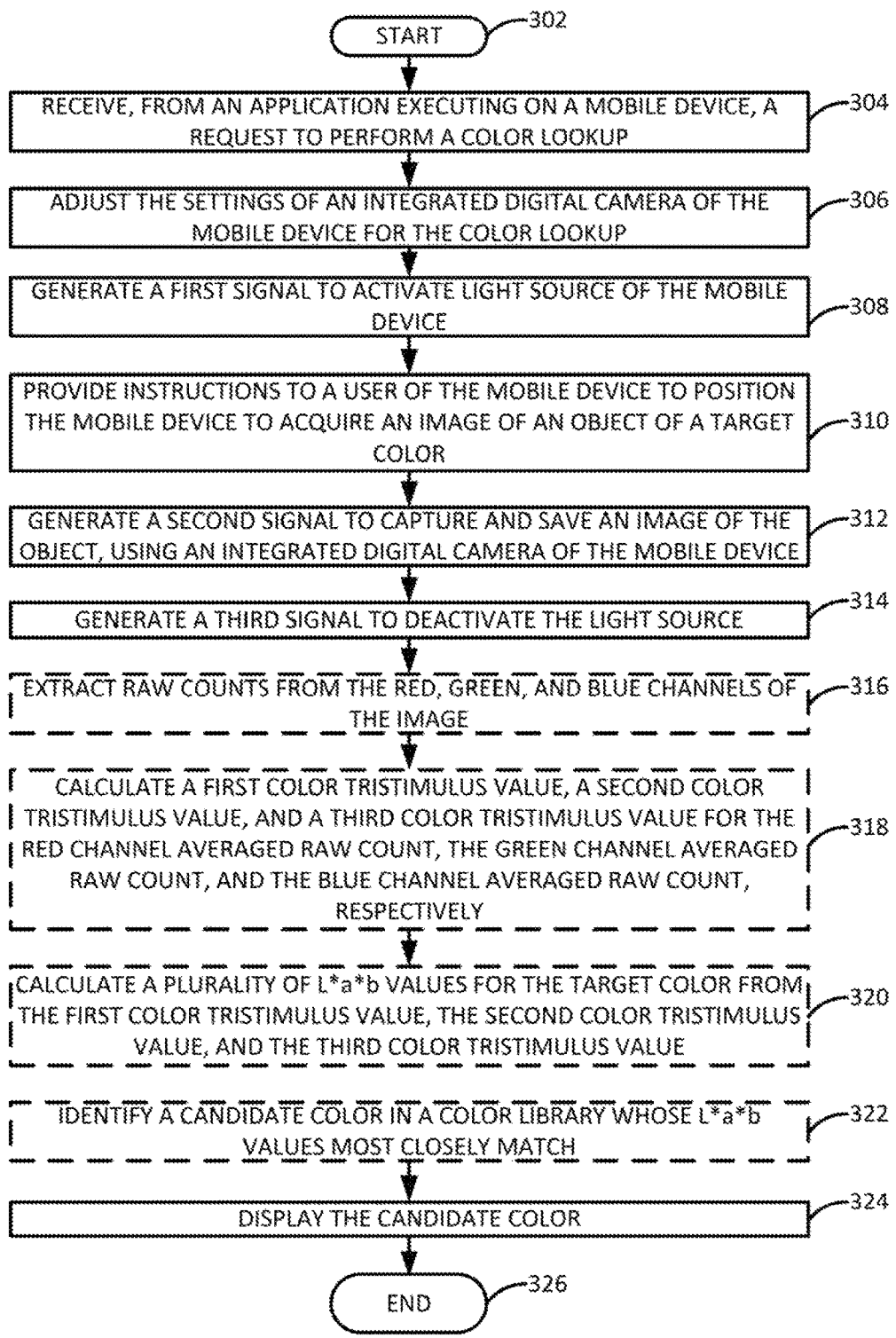
FIG. 3 is a flow chart illustrating one example of a method for color lookup using a mobile device.

FIG. 3 is a flow chart illustrating one example of a method 300 for color lookup using a mobile device. In one example, the method 300 may be performed, for instance, by the mobile device 110 of FIGS. 1A and 1B and/or by another computing device that is communicatively coupled to the mobile device 110. In another example, the method 500 may be performed by a processor of a computing device, such as the processor 502 illustrated in FIG. 5. For the sake of example, the method 300 is described below as being performed by a processing system.

The method 300 begins in step 302. In step 304, the processing system may receive a request to perform a color lookup. In one example, the request may be received from an application that is installed on a user's mobile device. For instance, the user may submit the request via a graphical user interface (GUI) that the application presents on the display of the mobile device.

In step 306, the processing system may adjust the settings of an integrated digital camera of the mobile device for color lookup. In one example, the settings that are adjusted may include shutter speed, sensitivity of the image sensor to light (e.g., ISO), and image format, among others. These settings may be adjusted through the mobile device's application programming interface (API). The optimal settings for color lookup may vary depending upon the make and model of the mobile device. However, in one example, the ISO may be set to the smallest value possible (e.g., fifteen) in order to minimize system noise. The shutter speed may be set so that the raw counts obtained from a white color sample are approximately two thirds of the maximum possible count (e.g., 1/800 seconds), in order to minimize saturation of the integrated digital camera. Autofocus functions may be disabled or set to zero.

In step 308, the processing system may generate a first signal to activate a light source of the mobile device. For instance, the mobile device may be a smart phone or a tablet computer, as discussed above, and the light source may be an LED flash or flashlight of the smart phone or tablet computer. In one example, the first signal activates the light source at the light source's highest intensity setting, such that the light source continues to emit light at the highest intensity setting until a subsequent signal is received to deactivate the light source. In a further example, if the auto-tuning features of the light source are not already disabled when step 310 is performed, then the first signal to may include a signal to deactivate the auto-tuning features.

In step 310, the processing system may provide instructions to the user to position the mobile device to acquire an image of a target color (e.g., a color that the user may be trying to identify via the color lookup). For instance, the processing system may track the position of the mobile device relative to an object of the target color via a "live image," using the integrated digital camera. Based on the live image, the processing system may provide instructions to the user (e.g., text instructions, audible instructions, an image overlay or box within which to position an image of the object, etc.) to adjust the position of the mobile device for optimal image quality.

In one example, the optimal position ensures that a distance between the mobile device and the object (e.g., a distance between the integrated digital camera 114 of the mobile device 110 and the object 112, as indicated by $L_2$ in FIG. 1A) is approximately equal to the distance between the integrated digital camera and a light source (e.g., an LED flashlight) of the mobile device (indicated as $L_1$ in FIG. 1A). This positioning forms a 45/0 illumination geometry (e.g., where θ in FIG. 1A equals forty-five degrees). However, in other examples, the positioning is not defined by a 45/0 geometry.

In the case where the optimal position is defined by a 45/0 geometry, the position may be maintained in a number of different ways. For instance, in one example, where the object of the target color is glossy or semi-glossy, $L_2$ may be determined by detecting a specular "hot spot" in the live image. The hot spot is an artifact created by the specular reflection of the mobile device's light source from a glossy object. Specifically, a portion of the light that is emitted by the light source will be directly reflected by the object, will enter the integrated digital camera, and will show as a very bright spot (or "hot spot") in the resulting image. The location and the size of the area on the object that would directly reflect the emitted light to form the hot spot does not tend to change as the object is moved in a direction that is normal to the integrated digital camera's lens. However, as the object is brought closer to the mobile device, the integrated digital camera's field of view shrinks. As a result, the hot spot may appear to move toward the edge of the image and may appear larger.

Because of the one-to-one relationship between the integrated digital camera's field of view and the distance between the object and the mobile device, the hot spot's size and location may be the same for mobile devices of the same make and model. Conversely, the hot spot's size and location may vary among different makes and models of mobile devices. Thus, determining the optimal location of the hot spot may allow one to define the optimal distance between the mobile device and the object. In other words, for a mobile device of a given make and model, the size and location of the hot spot is closely correlated with the distance between the mobile device and the object. Moreover, this correlation is invariant to the color of the object.

In one example, the processing system may instruct the user to hold the mobile device parallel to the object and to move the mobile device closer to the object (while still maintaining the parallel relative orientation as shown in FIG. 1A) while the processing system observes the resulting live image. The hot spot, if shown, will move toward the edge of the image as the distance between the mobile device and the object shrinks, as discussed above. When the hot spot reaches the known optimal location (which may be stored for the particular make and model of mobile device in application software, the mobile device local memory, or on a remote server), this may indicate that the distance between the mobile device and the object is optimal for color lookup.

In another example where the optimal position is defined by a 45/0 geometry, the mobile device may be equipped with a specially designed case (e.g., a mobile phone case) that holds the mobile device in a parallel orientation relative to the object of the target dolor, while also defining a distance between the camera and the object of the target color that is sufficient to achieve the optimal position. For instance, the case may have a thickness that is sufficient to create a gap between the integrated digital camera of the mobile device and the object of the target color when the mobile device is resting on the object of the target color. The size of the gap may be sufficient to create the 45/0 illumination geometry shown in FIG. 1A.

As discussed above, in some cases, the optimal position may not be defined by a 45/0 geometry. For instance, in another example, the optimal distance between the mobile device and the object may be determined by placing the mobile device on the target at a predefined angle α as shown in FIG. 1B (where the predefined angle α may vary according to the particular make and model of the mobile device). This allow the optimum distance between the mobile device and the object to be maintained indirectly.

For instance, the predefined angle α for the make and model of the mobile device may be looked up (e.g., in application software in, the mobile device local memory, or on a remote server). The processing system may instruct the user to hold the mobile device near the object (e.g., rest the end of the mobile device closest to the integrated digital camera against the object at a small angle such as between zero to twenty degrees, with the camera pointing at the object), and may observe the angle between the mobile device and the object using an angle-detecting sensor (e.g., an accelerometer) API of the mobile device. The processing system may instruct the user to adjust the angle (e.g., move the edge of the mobile device furthest from the integrated digital camera up or down, while keeping the top rear edge of the mobile device firmly against the object) until the predefined angle α is achieved (e.g., to within a threshold tolerance, such as plus or minus three degrees).

In step 312, the processing system may generate a second signal to capture and save an image (e.g., a still image) of the object of the target color, using the integrated digital camera of the mobile device. In one example, the integrated digital camera is a rear-facing camera (e.g., a camera whose lens is facing in an opposite direction from the display of the mobile device). In one example, where an angle-detecting sensor (e.g., an accelerometer) is used to monitor a user-adjusted angle between the mobile device and the object as discussed above, the processing system may automatically generate the second signal in response to the processing system detecting (e.g., based on communication with the angle-detecting sensor) that the angle between the mobile device and the object is equal to (or within a predefined tolerance with respect to) the predefined angle α that indicates a specified distance for image capture.

In one example, the image is saved in an open standard raw image file format to maintain the linearity and consistency of the image signal. File formats that involve heavy post-image processing (e.g., demosaicing, noise reduction, lens correction, color correction, exposure and white balance correction, etc.), such as the joint photographic experts group (JPEG) and the tagged image file format (TIFF) formats, may disturb the linearity and consistency of the image signal. In one example, the raw image file format may be any proprietary or non-proprietary raw image file format. One example of a suitable raw image file format is the Adobe Digital Negative Raw Image (DNG) file format. In the DNG file format, the white balance setting of the camera will not affect the values in the images.

In step 314, the processing system may generate a third signal to deactivate (i.e., turn off) the light source. Thus, in one example of the method 300, the light source is activated (i.e., turned on) before the image capture of the target color in step 312. The light source remains activated throughout image capture and is not deactivated until image capture is complete. By keeping the light source on and ensuring that the light source continues to emit light at its highest intensity setting, the ambient light surrounding the object of the target color can be overflooded. Overflooding the ambient light may lessen the effects of the ambient light on the performance of the method 300 and may also reduce the amount of time required to accurately measure the target color.

In optional step 316 (illustrated in phantom), the processing system may extract the raw counts from the red, green, and blue channels of the image. If the integrated digital camera is configured as described above (e.g., in connection with FIGS. 1 and 2), then the image captured in step 312 will comprise a 2D image in which each pixel of the image represents exactly one of the three colors (i.e., red, green, or blue).

In one example, the raw counts from the red, green, and blue channels are extracted in step 316 as follows. First, the middle one third of the image is selected or cropped to produce a region of interest in which the effective illumination angle distribution is reduced. For instance, selecting the middle one third of the image as the region of interest may reduce the effective illumination angle distribution from a first range of approximately thirty-six to fifty-seven degrees to a second range of approximately forty to fifty degrees. Reducing the effective illumination angle distribution may collimate the effective illumination beam, which may facilitate more accurate color measurement of the target color. Additionally, excluding the pixels at the edges of the image from the region of interest may also reduce light scattering and hazing introduced by the lens of the integrated digital camera.

Next, the raw counts for each color filter may be averaged to create three averaged raw counts: a red channel averaged raw count $d_R$, a green channel averaged raw count $d_G$, and a blue channel averaged raw count $d_B$. Thus, a single color measurement D, made by the integrated digital camera, may be defined as:

$$D = \begin{bmatrix} d_R \\ d_G \\ d_B \end{bmatrix}. \tag{EQN. 8}$$

In optional step 318 (illustrated in phantom), the processing system may calculate a first color tristimulus value, a second color tristimulus value, and a third color tristimulus value for the red channel averaged raw count $d_R$, the green channel averaged raw count $d_G$, and the blue channel averaged raw count $d_B$, respectively, thereby generating a plurality of color tristimulus values.

In one example, the color tristimulus values, which may be defined as $R^T=[\overline{X}, \overline{Y}, \overline{Z}]^T$, may be calculated from the raw counts according to:

$$\begin{bmatrix} \overline{X} \\ \overline{Y} \\ \overline{Z} \end{bmatrix} = M_A \times \begin{bmatrix} D \\ 1 \end{bmatrix}, \tag{EQN. 9}$$

where $M_A$ is a 3×4 color calibration matrix that converts the averaged raw counts (3×1) to the corresponding color tristimulus values (3×1). The color calibration matrix $M_A$ may be generated from the process by which the integrated digital camera is calibrated, discussed above. In this case, the averaged raw counts for all of the training colors can be combined into a 3×m matrix, D. Similarly, the 3×m matrix $R_T$ contains the known color tristimulus values of the training colors (under a predefined standard illuminant and CIE color match function).

In optional step 320 (illustrated in phantom), the processing system may calculate a plurality of L*a*b* values for the target color from the plurality of color tristimulus values, using a predefined illuminant. In one example, the predefined illuminant may be the CIE Standard Illuminant D65.

In optional step 322 (illustrated in phantom), the processing system may identify a candidate color in a color library whose L*a*b* values most closely match the L*a*b* values of the target color. In one example, a predefined number of the closest matching candidate colors may be identified (e.g., where the predefined number may equal three). In one example, the color library may be stored locally on the same device as the processing system. In another example, the color library may be stored on a remote database that is accessible to the processing system via a network.

Steps 316-322 are optional, because in one example, steps 316-322 may be performed by another device. For instance, if the processing system is part of the mobile device, steps 316-322 could be performed locally on the mobile device or could be performed remotely, e.g., by a server (as discussed in connection with FIG. 4).

In step 324, the processing system may display the closest matching candidate color (or the predefined number of the closest matching candidate colors) on a display of the mobile device. For instance, the display may show patches of the matching candidate color(s) or may identify the name(s), code(s), or other unique identifier(s) of the matching candidate color(s). The closest matching candidate color(s) may also be saved (either locally on the mobile device or on a remote server) for future reference.

The method 300 may end in step 326.

Once the closest matching candidate color to the target color has been identified, this information can be used to guide the formulation of a color mixture that is intended to match the target color. For instance, information associated with the closest matching candidate color (e.g., associated in the color library) may specify a combination of pigments that, when mixed in specified relative quantities, will produce the target color.

Figure 4:
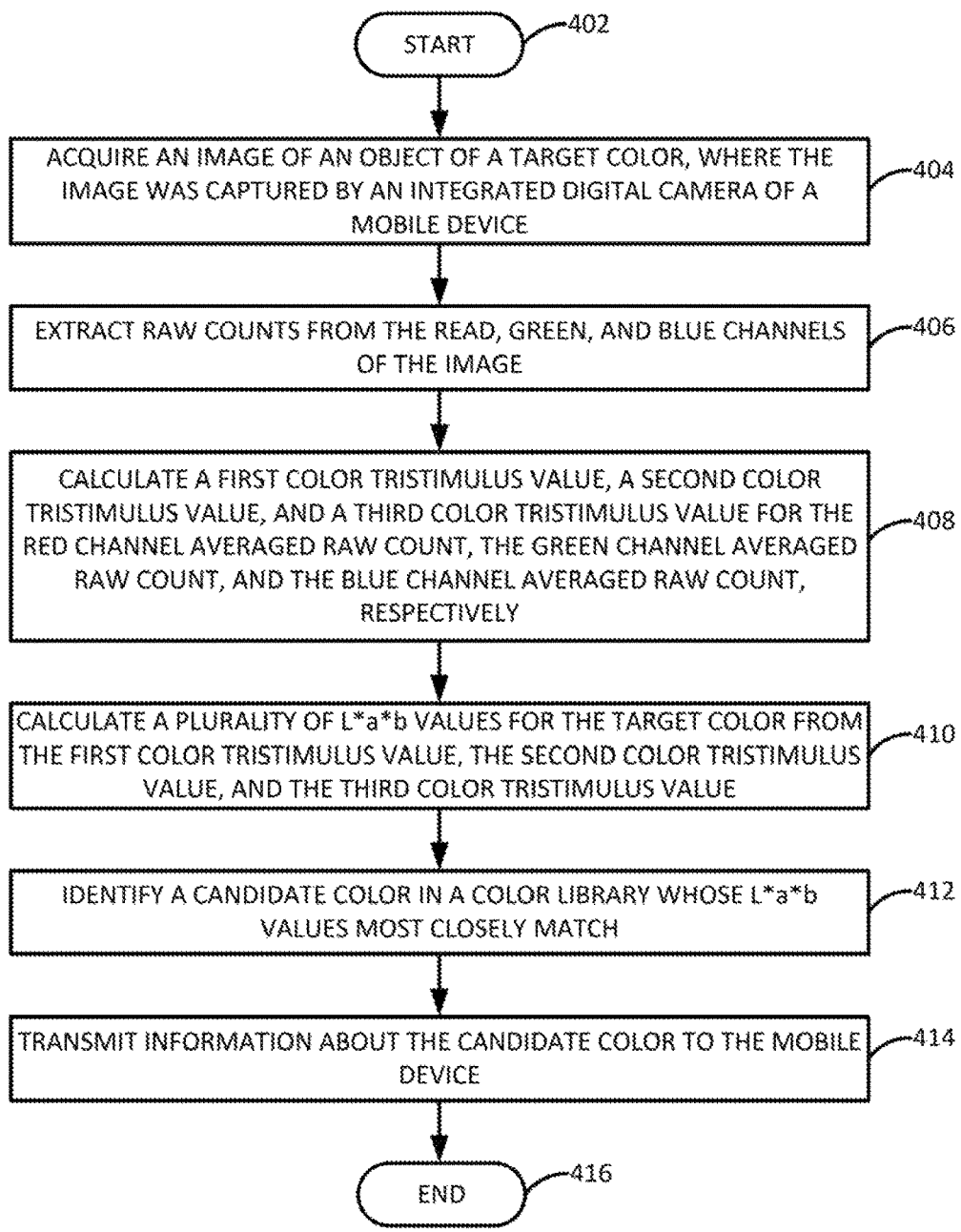
FIG. 4 is a flow chart illustrating another example of a method for color lookup using a mobile device.

FIG. 4 is a flow chart illustrating another example of a method 400 for color lookup using a mobile device. In one example, the method 400 may be performed, for instance, by the application server 104 of FIGS. 1A and 1B. In another example, the method 400 may be performed by a processor of a computing device, such as the processor 502 illustrated in FIG. 5. For the sake of example, the method 400 is described below as being performed by a processing system.

The method 400 begins in step 402. In step 404, the processing system may acquire an image of an object of a target color, where the image was captured by an integrated digital camera of a remote mobile device that is in communication (e.g., over a network) with the processing system. If the integrated digital camera is configured as described above (e.g., in connection with FIGS. 1 and 2), then the image acquired in step 402 will comprise a 2D image in which each pixel of the image represents exactly one of the three colors (i.e., red, green, or blue).

In step 406, the processing system may extract the raw counts from the red, green, and blue channels of the image of the object. In one example, the raw counts from the red, green, and blue channels are extracted in step 406 as follows. First, the middle one third of the image is selected or cropped to produce a region of interest in which the effective illumination angle distribution is reduced. For instance, selecting the middle one third of the image as the region of interest may reduce the effective illumination angle distribution from a first range of approximately thirty-six to fifty-seven degrees to a second range of approximately forty to fifty degrees. Reducing the effective illumination angle distribution may collimate the effective illumination beam, which may facilitate more accurate color measurement of the target color. Additionally, excluding the pixels at the edges of the image from the region of interest may also reduce light scattering and hazing introduced by the lens of the integrated digital camera.

Next, the raw counts for each color filter may be averaged to create three averaged raw counts: a red channel averaged raw count $d_R$, a green channel averaged raw count $d_G$, and a blue channel averaged raw count $d_B$. As discussed above, a single color measurement D, made by the integrated digital camera, may be defined according to EQN. 8 (above).

In step 408, the processing system may calculate a respective color tristimulus value for each of the red channel averaged raw count $d_R$, the green channel averaged raw count $d_G$, and the blue channel averaged raw count $d_B$, thereby generating a plurality of color tristimulus values. In one example, the color tristimulus values, which may be defined as $R^T=[\bar{X}, \bar{Y}, \bar{Z}]^T$, may be calculated from the raw counts according to EQN. 9 (above).

In step 410, the processing system may calculate a plurality of L*a*b* values for the target color from the plurality of color tristimulus values, using a predefined illuminant. In one example, the predefined illuminant may be the International Commission of Illumination (CIE) Standard Illuminant D65.

In step 412, the processing system may identify a candidate color in a color library whose L*a*b* values most closely match the L*a*b* values of the target color. In one example, a predefined number of the closest matching candidate colors may be identified (e.g., where the predefined number may equal three).

In step 414, the processing system may transmit data about the closest matching candidate color (or the predefined number of the closest matching candidate colors) to the mobile device. For instance, the data may include patches of the matching candidate color(s) or may identify the name(s), code(s), or other unique identifier(s) of the matching candidate color(s).

The method 400 may end in step 416.

Thus, the method 300 represents an example in which the color lookup process may be performed entirely by a single device (e.g., the mobile device). For instance, the mobile device may acquire the image of the object of the target color, measure the target color and make any necessary conversions, and perform the lookup in the color library (which may be stored locally or remotely) to identify the closest matching candidate colors. By contrast, the method 400 represents an example in which the color process may be performed in a distributed manner by two or more devices (e.g., the mobile device and a remote server). For instance, the mobile device may acquire the image of the object of the target color, while the remote server may measure the target color and make any necessary conversions, and may perform the lookup in the color library (which may be stored locally or remotely) to identify the closest matching candidate colors. As discussed above, the method 400 may allow the more processing intensive operations to be performed by a device having greater processing capabilities than the mobile device. This may allow results to be obtained more quickly and may also free up memory and processing on the mobile device for other applications.

It should be noted that the method 300 or 400 may be expanded to include additional steps or may be modified to include additional operations with respect to the steps outlined above. In addition, although not specifically specified, one or more steps, functions, or operations of the method 300 or 400 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 or 4 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 5 is a high level block diagram of the color lookup method that is implemented using a computing device 500.

In one example, a general purpose computing device 500 comprises a processor 502, a memory 504, a color lookup module 505 and various input/output (I/O) devices 506 such as a display, a keyboard, a mouse, a modem, a network connection and the like. In one example, at least one I/O device is a storage device (e.g., a disk drive, an optical disk drive, a floppy disk drive). It should be understood that the color lookup module 505 can be implemented as a physical device or subsystem that is coupled to a processor through a communication channel.

Alternatively, the color lookup module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Additionally, the software may run in a distributed or partitioned fashion on two or more computing devices similar to the general purpose computing device 500. Thus, in one example, the color lookup module 505 for calibrating a multi-channel color measurement instrument in the field described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various examples which incorporate the teachings of the present disclosure have been shown and described in detail herein, those skilled in the art can readily devise many other varied examples that still incorporate these teachings.

What is claimed is:

1. A method, comprising:
acquiring, by a processing system of a mobile device, an image of an object of a tartlet color, wherein the image was captured by an integrated digital camera of the mobile device while the object was illuminated by a single light emitting diode of the mobile device, wherein the acquiring comprises:
providing, by the processing system of the mobile device, instructions to a user of the mobile device, wherein the instructions guide the user in positioning the mobile device to acquire the image, wherein the providing comprises:
monitoring, by the processing system of the mobile device, an angle between the mobile device and the object as the user holds the mobile device against a surface of the object and tilts an edge of the mobile device away from the object, wherein the monitoring is achieved through communication with an angle-detecting sensor of the mobile device;
generating, by the processing system of the mobile device, a first signal to activate the single light emitting diode of the mobile device;
generating, by the processing system of the mobile device subsequent to generating the first signal, a second signal to capture and save the image by the integrated digital camera, wherein the processing system generates the second signal automatically in response to detecting, via the monitoring, that the angle between the mobile device and the object is equal to a predefined angle; and
generating, by the processing system of the mobile device subsequent to generating the second signal, a third signal to deactivate the single light emitting diode of the mobile device;
calculating, by the processing system of the mobile device, a first plurality of values that describes the target color, wherein the calculating is based on an analysis of a pixel of the image; and
identifying, by the processing system of the mobile device, a first candidate color from among a plurality of candidate colors in a color library, wherein each candidate color in the plurality of candidate colors is associated with a second plurality of values that describes the each candidate color, and wherein the second plurality of values describing the first candidate color matches the first plurality of values more closely than any second plurality of values associated with another candidate color of the plurality of candidate colors.

2. The method of claim 1, wherein the acquiring further comprises:
adjusting, by the processing system of the mobile device, a setting of the integrated digital camera of the mobile device.

3. The method of claim 1, wherein the first plurality of values describes the target color in a first color space that approximates a perception of color by a human eye.

4. The method of claim 3, wherein the calculating comprises:
calculating, by the processing system of the mobile device, a red channel averaged raw count, a green channel averaged raw count, and a blue channel averaged raw count for the image;
converting, by the processing system of the mobile device, the red channel averaged raw count, the green channel averaged raw count, and the blue channel averaged raw count to a first color tristimulus value, a second color tristimulus value, and a third color tristimulus value, respectively, using a color calibration matrix, wherein the first color tristimulus value, the second color tristimulus value, and the third color tristimulus value describe the target color in a second color space different from the first color space.

5. The method of claim 4, wherein the first color space is an International Commission of Illumination 1931 XYZ color space, and the second color space is an International Commission of Illumination L*a*b* color space.

6. The method of claim 1, further comprising:
displaying, by the processing system of the mobile device, information about the first candidate color on a display of the mobile device.

7. The method of claim 1, wherein the mobile device comprises a smart phone.

8. The method of claim 1, wherein the color library is stored on a remote database.

9. The method of claim 1, wherein a lens of the integrated digital camera of the mobile device faces in a direction opposite of a display of the mobile device.

10. The method of claim 1, further comprising:
calibrating, by the processing system of the mobile device, the integrated digital camera of the mobile device prior to the acquiring.

11. The method of claim 10, wherein the calibrating comprises:
capturing, by the processing system of the mobile device, a plurality of images of a plurality of training colors, using the integrated digital camera of the mobile device;
obtaining, by the processing system of the mobile device, a first matrix for each training color of the plurality of training colors, wherein the first matrix contains known color tristimulus values of the each training color;
calculating, by the processing system of the mobile device, a second matrix for each image of the plurality of images, wherein the second matrix contains a plurality of averaged raw counts for the each image, and wherein each averaged raw count of the plurality of averaged raw counts corresponds to pixels of one color in the each image; and
estimating, by the processing system of the mobile device, a third matrix and a vector that map the second matrix to the first matrix.

12. The method of claim 10, wherein the calibrating comprises a linear correction process comprising:
capturing, by the processing system of the mobile device, a first plurality of images of a black sample and a second plurality of images of a white sample, using the integrated digital camera of the mobile device;
calculating, by the processing system of the mobile device, a first plurality of raw counts from the first plurality of images, wherein each raw count of the first plurality of raw counts corresponds to pixels of one color in each image of the first plurality of images;
calculating, by the processing system of the mobile device, a second plurality of raw counts from the second plurality of images, wherein each raw count of the second plurality of raw counts corresponds to pixels of one color in each image of the second plurality of images;
obtaining, by the processing system of the mobile device, a third plurality of raw counts, wherein each raw count of the third plurality of raw counts corresponds to pixels of one color in each image of a third plurality of images of the black sample, as measured by a master instrument of a same make and model as the mobile device;
obtaining, by the processing system of the mobile device, a fourth plurality of raw counts, wherein each raw count of the fourth plurality of raw counts corresponds to pixels of one color in each image of a fourth plurality of images of the white sample, as measured by the master instrument; and
calculating, by the processing system of the mobile device, a plurality of coefficients that map that first plurality of raw counts and the second plurality of raw counts to the third plurality of raw counts and the fourth plurality of raw counts.

13. A non-transitory computer-readable medium storing instructions which, when executed by a processing system of a mobile device, cause the processing system of the mobile device to perform operations, the operations comprising:
acquiring an image of an object of a target color, wherein the image was captured by an integrated digital camera of the mobile device while the object was illuminated by a single light emitting diode of the mobile device, wherein the acquiring comprises:
providing instructions to a user of the mobile device, wherein the instructions guide the user in positioning the mobile device to acquire the image, wherein the providing comprises:
monitoring an angle between the mobile device and the object as the user holds the mobile device against a surface of the object and tilts an edge of the mobile device away from the object, wherein the monitoring is achieved through communication with an angle-detecting sensor of the mobile device;
generating a first signal to activate the single light emitting diode of the mobile device;
generating, subsequent to generating the first signal, a second signal to capture and save the image by the integrated digital camera, wherein the processing system generates the second signal automatically in response to detecting, via the monitoring, that the angle between the mobile device and the object is equal to a predefined angle; and
generating, subsequent to generating the second signal, a third signal to deactivate the single light emitting diode of the mobile device;
calculating a first plurality of values that describes the target color, wherein the calculating is based on an analysis of a pixel of the image; and
identifying a first candidate color from among a plurality of candidate colors in a color library, wherein each candidate color in the plurality of candidate colors is associated with a second plurality of values that describes the each candidate color, and wherein the second plurality of values describing the first candidate color matches the first plurality of values more closely than any second plurality of values associated with another candidate color of the plurality of candidate colors.

14. A method, comprising:
acquiring, by a processing system in a communication network, an image of an object of a target color, wherein the image was captured by an integrated digital camera of a mobile device that is communicatively coupled to the processing system while the object was illuminated by a single light emitting diode of the mobile device, wherein the acquiring comprises:
providing, by the processing system, instructions to the mobile device, wherein the instructions guide a user of the mobile device in positioning the mobile device to acquire the image, wherein the providing comprises:
monitoring, by the processing system, an angle between the mobile device and the object as the user holds the mobile device against a surface of the object and tilts an edge of the mobile device away from the object, wherein the monitoring is achieved through communication with an angle-detecting sensor of the mobile device;
generating, by the processing system, a first signal instructing the mobile device to activate the single light emitting diode;
generating, by the processing system subsequent to generating the first signal, a second signal instructing the mobile device to capture and save the image by the integrated digital camera, wherein the processing system generates the second signal automatically in response to detecting, via the monitoring, that the angle between the mobile device and the object is equal to a predefined angle; and generating, by the processing system subsequent to generating the second signal, a third signal instructing the mobile device to deactivate the single light emitting diode;

calculating, by the processing system, a first plurality of values that describes the target color, wherein the calculating is based on an analysis of a pixel of the image;

identifying, by the processing system, a first candidate color from among a plurality of candidate colors in a color library, wherein each candidate color in the plurality of candidate colors is associated with a second plurality of values that describes the each candidate color, and wherein the second plurality of values describing the first candidate color matches the first plurality of values more closely than any second plurality of values associated with another candidate color of the plurality of candidate colors; and transmitting, by the processing system, information about the first candidate color to the mobile device.

15. The method of claim 1, wherein operation of the single light emitting diode is controllable by the processing system of the mobile device.

16. A method, comprising:

controlling, by a processing system of a mobile device, a single light emitting diode of the mobile device to illuminate an object of a target color;

tracking, by the processing system of the mobile device, a location of a specular hot spot in a live image of the object;

determining, by the processing system of the mobile device, that the mobile device is positioned an optimal distance from the object when the location of the specular hot spot matches a known optimal location of the specular hot spot that is associated with a make and model of the mobile device;

providing, by a processing system of the mobile device, instructions to a user of the mobile device to hold the mobile device so that the location of the specular hot spot matches the known optimal location;

controlling, by the processing system of the mobile device, an integrated digital camera of the mobile device to acquire an image while the object is illuminated by the single light emitting diode of the mobile device;

calculating, by the processing system of the mobile device, a first plurality of values that describes the target color, wherein the calculating is based on an analysis of a pixel of the image; and identifying, by the processing system of the mobile device, a first candidate color from among a plurality of candidate colors in a color library, wherein each candidate color in the plurality of candidate colors is associated with a second plurality of values that describes the each candidate color, and wherein the second plurality of values describing the first candidate color matches the first plurality of values more closely than any second plurality of values associated with another candidate color of the plurality of candidate colors.

17. The method of claim 1, wherein the mobile device includes a case, and wherein a thickness of the case is configured to create a gap between the integrated digital camera of the mobile device and the object of the target color when the mobile device rests against the object of the target color.

18. The method of claim 1, wherein the instructions guide the user in positioning the mobile device so that a 45/0 illumination geometry is formed between the single light emitting diode of the mobile device and the object.

19. The method of claim 1, wherein the first signal activates the single light emitting diode of the mobile device at a highest intensity setting of the single light emitting diode of the mobile device.

20. The method of claim 14, wherein the mobile device comprises a smart phone.

21. The method of claim 14, wherein a lens of the integrated digital camera of the mobile device faces in a direction opposite of a display of the mobile device.

22. The method of claim 16, wherein the mobile device comprises a smart phone.

23. The method of claim 16, wherein a lens of the integrated digital camera of the mobile device faces in a direction opposite of a display of the mobile device.

24. The method of claim 16, wherein the optimal location is a location that places the mobile device at a first distance from the object, and wherein the first distance is equal to a second distance between the single light emitting diode and the integrated digital camera of the mobile device.

* * * * *